US008023984B2

(12) United States Patent
Jin et al.

(10) Patent No.: US 8,023,984 B2
(45) Date of Patent: Sep. 20, 2011

(54) SYSTEM AND METHOD OF CONTROLLING TRANSMIT POWER FOR MOBILE WIRELESS DEVICES WITH MULTI-MODE OPERATION OF ANTENNA

(75) Inventors: Xin Jin, Nepean (CA); Jorgen S. Nielsen, Calgary (CA)

(73) Assignee: Research In Motion Limited, Waterloo (CA)

( * ) Notice: Subject to any disclaimer, the term of this patent is extended or adjusted under 35 U.S.C. 154(b) by 1195 days.

(21) Appl. No.: 10/679,575

(22) Filed: Oct. 6, 2003

(65) Prior Publication Data

US 2005/0075123 A1   Apr. 7, 2005

(51) Int. Cl.
*H04B 7/00* (2006.01)
*H04B 1/00* (2006.01)
*H04M 1/00* (2006.01)

(52) U.S. Cl. ................. 455/522; 455/69; 455/569.1

(58) Field of Classification Search ........... 455/550.1, 455/552, 69, 575.5, 575.6, 67.11, 522, 575.7, 455/556.1, 557, 575.1, 90.1, 569.1, 127.1, 455/569.2, 575.2, 571, 574, 90.3, 550.2, 455/552.1; 343/702
See application file for complete search history.

(56) References Cited

U.S. PATENT DOCUMENTS

| | | | | |
|---|---|---|---|---|
| 5,541,609 A | * | 7/1996 | Stutzman et al. | 343/702 |
| 5,815,820 A | * | 9/1998 | Kiem et al. | 455/575.7 |
| 5,898,908 A | * | 4/1999 | Griffin et al. | 455/127.2 |
| 5,983,100 A | * | 11/1999 | Johansson et al. | 455/426.1 |
| 6,456,856 B1 | * | 9/2002 | Werling et al. | 455/575.5 |
| 6,600,933 B1 | * | 7/2003 | Hiramatsu et al. | 455/561 |
| 6,657,595 B1 | * | 12/2003 | Phillips et al. | 343/702 |
| 6,710,651 B2 | * | 3/2004 | Forrester | 330/129 |
| 7,039,435 B2 | * | 5/2006 | McDowell et al. | 455/522 |
| 7,120,472 B2 | * | 10/2006 | Okagaki | 455/566 |
| 7,123,947 B2 | * | 10/2006 | Okagaki | 455/566 |
| 7,127,276 B2 | * | 10/2006 | Okagaki | 455/566 |
| 7,146,139 B2 | * | 12/2006 | Nevermann | 455/115.1 |
| 7,269,452 B2 | * | 9/2007 | Cheung et al. | 455/575.6 |
| 7,292,880 B2 | * | 11/2007 | Lehtonen | 455/569.1 |

(Continued)

FOREIGN PATENT DOCUMENTS

DE    101 36 215 C1    2/2003

(Continued)

OTHER PUBLICATIONS

CIPO: Office Action dated Feb. 26, 2009 for Pat. Appln. No. 2483357 (3 pgs).

(Continued)

*Primary Examiner* — Tilahun B Gesesse
(74) *Attorney, Agent, or Firm* — Jones Day (57) ABSTRACT

A radio control system in a wireless communication device includes a sensor operable to detect a change in a use mode of the wireless communication device during a communication session according to a pre-determined list of conditions, the use mode being one of a plurality of use modes that the communication device can operate in. The radio control system also includes a power controller connected to the sensor, that is operable to determine a power configuration according to the user mode detected. The power configuration is adjusted to balance the radio frequency coverage of a signal to be transmitted and the SAR. Of the radiation absorption. Each use mode is a different scenario in which the wireless communication device can be used.

4 Claims, 7 Drawing Sheets

U.S. PATENT DOCUMENTS

| | | | |
|---|---|---|---|
| 7,383,065 B2 * | 6/2008 | Skinner et al. | 455/573 |
| 7,439,992 B2 * | 10/2008 | Okagaki | 345/685 |
| 2002/0016155 A1 * | 2/2002 | Charbonnier | 455/90 |
| 2003/0064732 A1 * | 4/2003 | McDowell et al. | 455/456 |
| 2003/0160726 A1 | 8/2003 | Grant et al. | |
| 2007/0004464 A1 * | 1/2007 | Lair et al. | 455/569.1 |

FOREIGN PATENT DOCUMENTS

| | | |
|---|---|---|
| DE | 10136215 C1 | 2/2003 |
| EP | 0 994 578 A2 | 4/2000 |
| EP | 0 994 578 A3 | 7/2000 |
| EP | 1152584 A1 | 11/2001 |
| EP | 1298809 A2 * | 2/2003 |
| EP | 1 298 809 A2 | 4/2003 |
| EP | 1 298 809 A3 | 2/2004 |
| WO | 98/51108 A2 | 11/1998 |

OTHER PUBLICATIONS

EPO: Communication (extended European search report) for Application No. 09158669.3-1246/2086118 dated Jul. 7, 2011 (8 pages).

* cited by examiner

SYSTEM AND METHOD OF CONTROLLING TRANSMIT POWER FOR MOBILE WIRELESS DEVICES WITH MULTI-MODE OPERATION OF ANTENNA

BACKGROUND

1. Technical Field

This application relates to wireless communication techniques in general, and to a system and method of transmit power control for a mobile wireless device with multiple operating modes of the antenna in particular.

2. Description of the Related Art

An antenna is used in a mobile communication device for picking up received signals and for radiating transmitted signals. For transmitting purposes, the radiated radio frequency field includes "Far Field" and "Near Field" components. The far field is the radiated field that is useful for wireless communication. The transition from the near field to the far field is gradual but a practical definition is that the near field is dominant at distances less than twice an antenna's largest dimension squared divided by the wavelength from the antenna. Conversely, the far field refers to the field generated by the antenna at distances beyond twice an antenna's largest dimension squared divided by the wavelength.

The near field is close to the user's body, and also close to the circuitry within the wireless device, both of which may result in various side effects. One of these side effects is radiation absorption to the human user, measured by the Specific Absorption Rate or SAR. SAR is the measurement of the amount of radiation absorption by the human body. SAR is usually calculated in watts per kilogram or milli-watts (mW) per gram.

Different countries have different regulatory requirements for SAR. For example, in North America, the SAR of a handheld wireless communication device might be regulated to not exceed the 1.6 mW/g limit while the device is held at a human head. It is a challenge to design an antenna and its surrounding structure of a wireless communication device to generate a strong far field, while also minimizing SAR, as these may be conflicting requirements.

Certain designs may utilize multiple operating antenna positions to satisfy the conflicting requirements. For example, a whip antenna can have two operating positions—an extended position and retracted position; a flip mobile phone can have open and close positions, and the antenna can further be extended and retracted in combination with the open and close positions. Each of the positions may have different effects to the SAR of the user and to the antenna gain in the far field. This may not be an acceptable solution, as improving the situation in one field may be done at the expense of the situation at the other field.

The SAR is proportional to the transmitted power generated by a device. The transmitted power is typically regulated by a transmit power control unit in the device. A maximum allowed transmit power is usually set to a given value in a transmit power control unit so that the SAR cannot exceed the regulatory limit.

SUMMARY

According to one aspect of the present application, there is provided a radio control system in a communication device, the radio control system comprising: (a) a sensor capable of detecting a change in use mode of said device; (b) a power controller connected to said sensor to determine a power configuration based on the use mode; and (c) a power regulator connected to said power controller to apply the power configuration to a transmitted signal.

According to another aspect of the present application, there is provided a method of controlling a power configuration in a communication device, comprising the steps of: (a) detecting a use mode; (b) changing the power configuration as a function of the use mode; and (c) communicating at the changed power configuration.

According to yet another aspect of the present application, there is provided a radio control system in a communication device comprising: (a) a sensor capable of detecting a change in use mode of said device; (b) a radio controller connected to said sensor to determine a radio configuration based on the use mode; and (c) a radio configuration module connected to said radio controller to apply the radio configuration to the transmitted signal.

BRIEF DESCRIPTION OF THE DRAWINGS

Embodiments of the present application will now be described, by way of example only, with reference to the attached figures, wherein.

Same reference numerals are used in different figures to denote similar elements.

DETAILED DESCRIPTION OF THE DRAWINGS

To satisfy both the communication needs and the SAR requirements, it is envisaged in this application that the maximum allowed transmitted power be made dependent on the specific use mode of a wireless device. Furthermore, it is envisaged that certain other radio configuration aspects in addition to the transmit power can also be made dependent on the use mode, for such purposes as optimising SAR, battery life, communication range, channel capacity, and/or spectrum efficiency.

Figure 1:
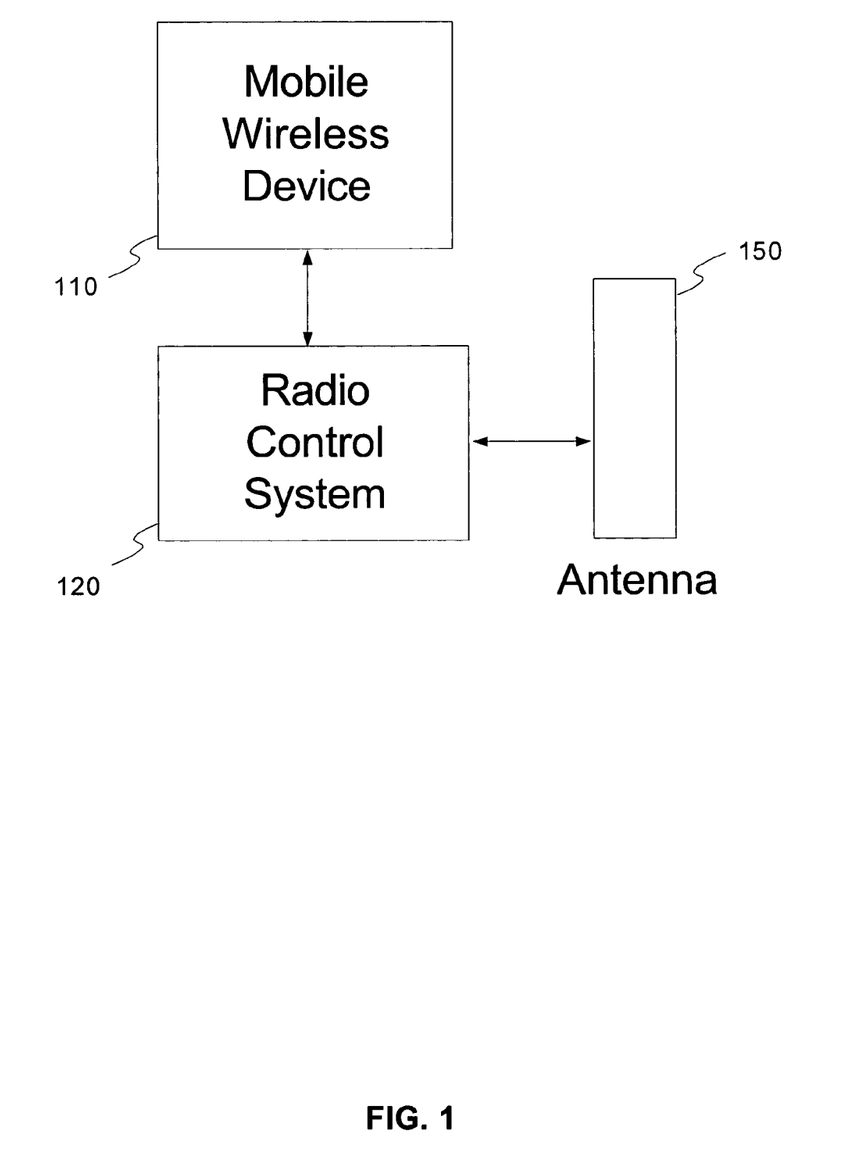
FIG. 1 is a block diagram illustrating a system overview of the interaction between a mobile wireless device, radio control system and an antenna.

Referring to the drawings, FIG. 1 is a block diagram illustrating a system overview of the interaction between a mobile wireless device, radio control system and an antenna. This illustrates three main modules—the mobile wireless device 110, the radio control system 120 and the antenna 150.

The radio control system 120, a subsystem of the mobile wireless device 110, is responsible for sensing use modes of mobile wireless device 110. Use mode sensing enables controlling the power and changing the power configuration of the transmitted power feeding into the antenna 150 as a function of use mode. The radio control system 120 and the antenna 150 are integral components of the mobile wireless device 110, however, for the illustration of the interactions, these two components are drawn as two separate components outside of the mobile wireless device 110.

Use modes include different scenarios where the mobile wireless device can be used. Examples of use modes include "In Hand", "By Head", "In Holster", "In Cradle", "Antenna Drawn", "In Vehicle-Cradle", "External Antenna Attached", "Antenna Position", "Lid Antenna", "Device Lid Opened", "Headset Connection", and "User Keyboard Activity". The "In Hand" use mode refers to the scenario where the mobile wireless device is placed on the user's hand. The "By Head" use mode refers to the scenario where the mobile wireless device is placed in proximity to the user's head. The "In Holster" use mode refers to the scenario where the mobile wireless device is placed in the device holster. It is envisaged that the term use mode further includes any mode of operation of the antenna and its related structure. For example, a whip antenna can have two modes of operation of the antenna—extended position and retracted position; a flip mobile phone can have open and close positions, and the antenna can further be extended and retracted in combination with the open and close positions.

The "In Cradle" use mode refers to the scenario where the mobile wireless device is placed in the device cradle. The device cradle generally refers to the peripheral that enables the mobile wireless device to communicate with the user's computer, preferably enabling the device to install/uninstall application onto their device and synchronize data between their device and computer. The "In Vehicle-Cradle" is similar to the "In Cradle" use mode but refers to a specialized cradle to be used in an automotive vehicle.

The "Antenna Drawn" use mode refers to the scenario where the antenna on the mobile wireless device is drawn upwards or outwards to promote enhanced antenna coverage. The "Antenna Position" use mode is similar to the "Antenna Drawn" use mode with the main differentiation being that the antenna can be in different configurations. Some examples of antenna positions include fully drawn, half drawn, one quarter drawn, or having the antenna in an un-drawn state.

The "External Antenna Attached" use mode refers to the scenario where there is an external antenna attached to the mobile wireless device and the mobile wireless device is using this external antenna for wireless communication. The "Lid Antenna" use mode refers to the scenario where the mobile wireless device incorporates a specialized antenna within the lid of the mobile wireless device.

The "Headset Connection" use mode refers to the scenario where there is a portable headset connected to the mobile wireless device while using mobile wireless device as a wireless voice communication device. The "User Keyboard Activity" use mode refers to the scenario where the mobile wireless device detects user keyboard activity on the device keyboard. User keyboard activity may include pressing a device key on the keyboard or selecting a virtual key on a touchscreen display.

The list of use modes is not limited to the above use mode scenarios; there may be other scenarios not included on this list. The list of use modes is not exclusive to one particular scenario, but may include a combination of different scenarios to create multi use modes. For example, there may be a use scenario where the mobile wireless device is in the user's hand with the antenna drawn, connected to a headset and the user is typing on the keyboard. This example incorporates the "In Hand", "Antenna Drawn", "Headset Connect" and "User Keyboard Activity" use modes to fully describe the scenario.

The preferred antenna 150 of the mobile wireless device 110 is an internal antenna. However, the antenna 150 is not limited to this embodiment; it can also include other types of antennas, including, but not limited to external antennas, in-vehicle car-mount antennas and cradle-mounted antennas.

Figure 2:
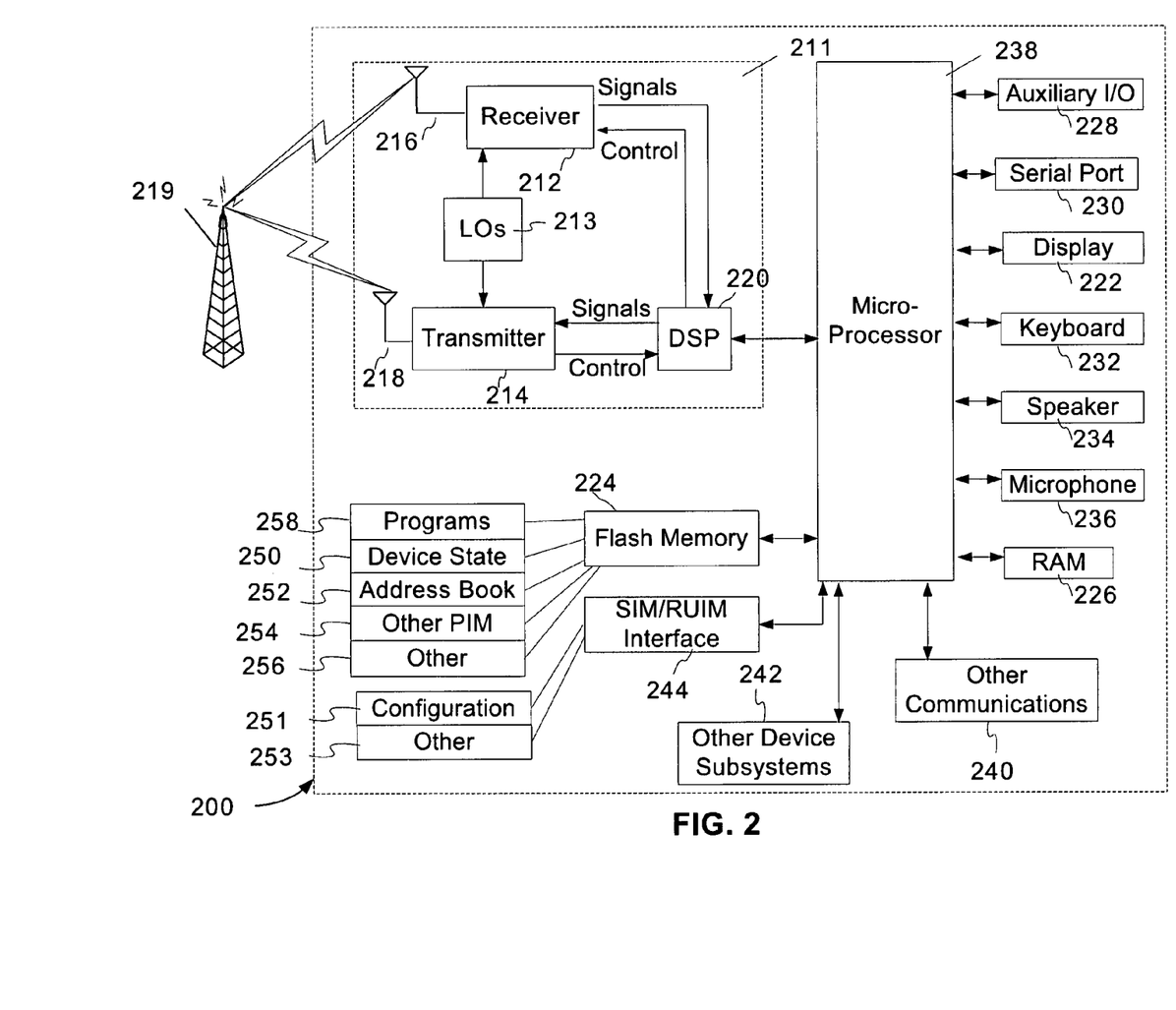
FIG. 2 is a block diagram illustrating a mobile wireless device including preferred embodiments of the apparatus and method of the current application.

FIG. 2 is a block diagram illustrating a mobile wireless device including preferred embodiments of the apparatus and method of the current application. Mobile wireless device 200 is preferably a two-way wireless electronic communication device having at least voice and/or data communication capabilities. Depending on the exact functionality provided, the wireless device may be referred to as a data messaging device, a two-way pager, a wireless e-mail device, a cellular telephone with or without data messaging capabilities, a wireless Internet appliance, or a data communication device, as examples.

Where mobile wireless device 200 is enabled for two-way communication, it incorporates a radio subsystem 211, including both a receiver 212 and a transmitter 214, as well as associated components such as one or more, preferably embedded or internal, antenna elements 216 and 218, local oscillators (LOs) 213, and a processing module such as a digital signal processor (DSP) 220. As will be apparent to those skilled in the field of communications, the particular design of the radio subsystem 211 is dependent upon the communication network in which the device is intended to operate.

Mobile wireless device 200 preferably includes a microprocessor 238 that controls the overall operation of the device. Communication functions, including at least data and/or voice communications, are performed through radio subsystem 211. Microprocessor 238 also interacts with further device subsystems such as the display 222, flash memory 224, random access memory (RAM) 226, auxiliary input/output (I/O) subsystems 228, serial port 230, keyboard 232, speaker 234, microphone 236, a short-range communications subsystem 240 and any other device subsystems generally designated as 242. The other device subsystem 242 of interest is the radio control system 120.

Figure 3:
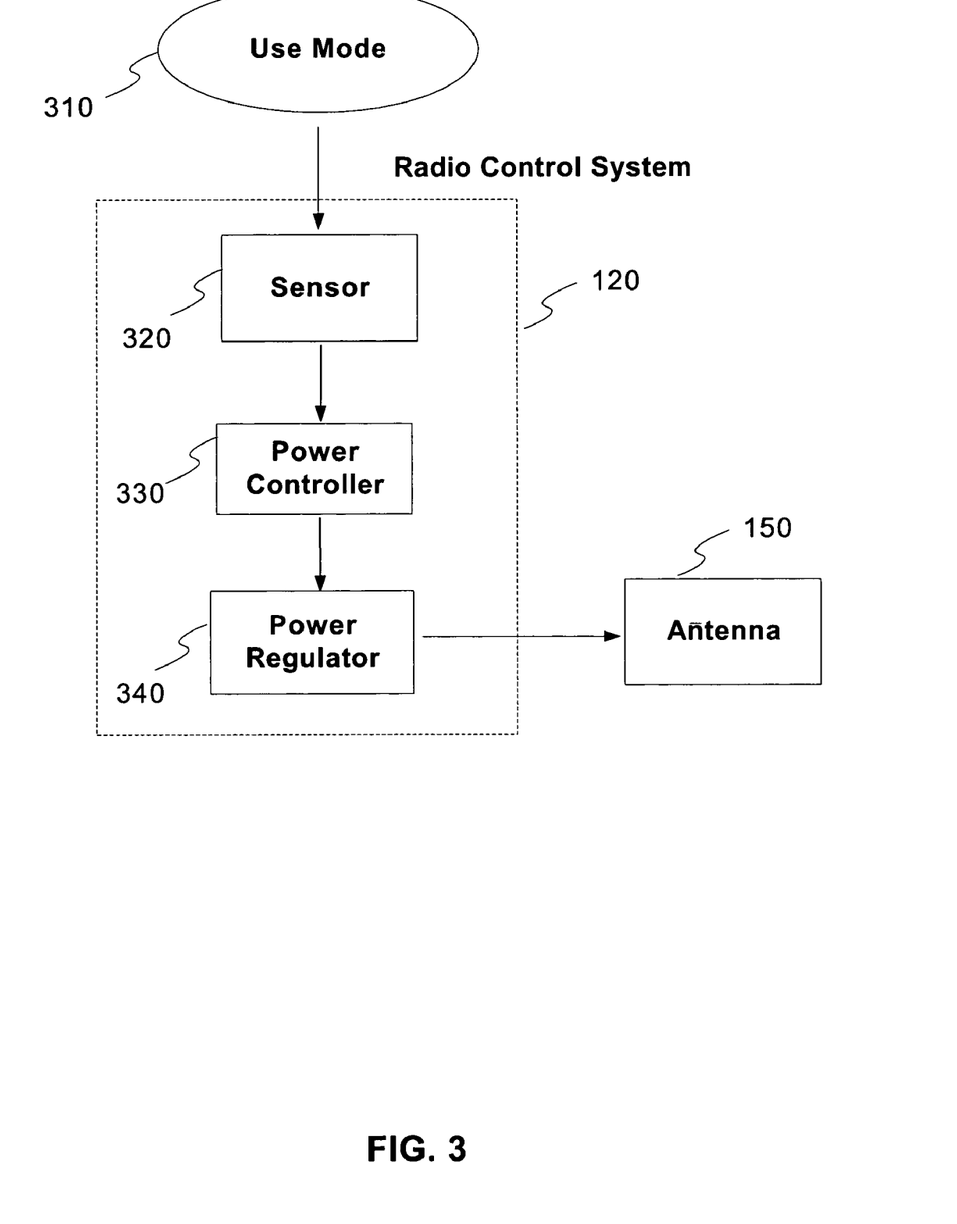
FIG. 3 is a block diagram illustrating the various components of the radio control system.

FIG. 3 is a block diagram illustrating the various components of the radio control system. The radio control system 120 consists of three main modules—the sensor 320, the power controller 330 and the power regulator module 340. The radio control system 120 can operate with an antenna that has multiple modes of operation. For example, the antenna may be moveable, or can be selectively connected to one of multiple antennas.

The sensor 320 of the radio control system 310 detects a change in the different use modes 310. After the sensor module 320 detects the use mode 310 as defined by a pre-determined list of conditions, the use mode is sent to the power controller module 330 for processing. The sensor component 320 may consist of a variety of sensors including an infrared, acoustic, echo, thermal, proximity, and/or keyboard detection sensor. For example, to detect the "Near Head" use mode, the mobile wireless device 110 may utilize a proximity sensor that detects the return loss from the antenna 150 as a result of placing the antenna in proximity to the human head.

The power controller 330 determines the appropriate power level to optimally balance RF coverage and SAR requirements. The power controller determines the appropriate power levels and passes this info onto the power regulator module 340 that applies the desired power level feeding to the antenna 150. Examples of power regulator functionalities include limiting maximum power and minimum power levels in addition to existing power control algorithms, amending the power level offsets accounting for effective antenna gain change caused by the use mode changes.

In conjunction with affecting power configuration, it is envisaged that various transmission rates, antenna radiating patterns, different antenna gains and signal encoding and modulation methods, power control attributes can also be considered, in which cases the power controller 330 shall be better referred to with a name having broader meaning, for example, a radio controller. The radio controller can determine the optimal settings of these aspects, based on the operating mode that the sensor 320 sensed.

It is also envisaged that the power control configuration operates in a dynamic nature where the power control configuration is dynamically updated throughout a call. The power configuration changes dynamically during the call based on different use modes. For example, a wireless device might start with one power configuration, but dynamically changes to another when the user pulls out the antenna, places the device close to his head, or switches to speaker phone.

The power regulator module 340 can be further replaced by a plurality of radio configuration modules capable of altering at least one aspect of the radio configurations, such as the transmission rate, coding and modulation methods, power control attributes (e.g., step size, update rates), multiple element antenna feeding selection and/or feeding gains that optimize the antenna radiating patterns.

Figure 4:
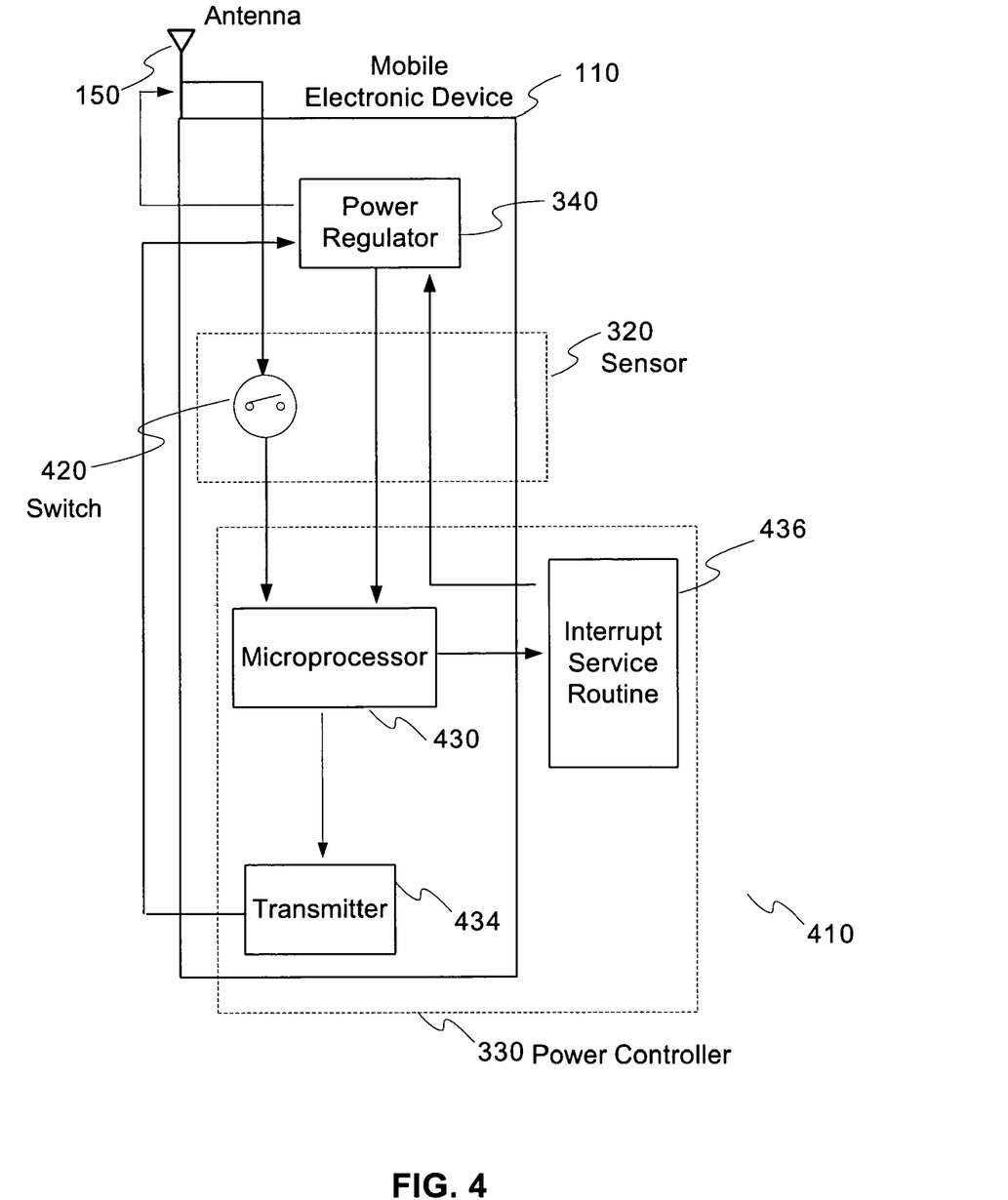
FIG. 4 is a block diagram illustrating an interrupt service routine of the radio control system within a mobile wireless device.

FIG. 4 is a block diagram illustrating an interrupt service routine of the radio control system within a mobile wireless device. The embodiment of interest in this diagram is the "Antenna Drawn" use mode where the antenna 150 is drawn from a resting position. This diagram elaborates the structure of the different components of the radio control system 120 in the context of a mobile wireless device 110. The internal components of the mobile wireless device 110 include a switch 420, microprocessor 430, interrupt service routine (ISR) 436, power regulator module 340 and transmitter 434. The aforementioned components function together to form an ISR Regulator Control System 410.

Within the mobile wireless device 110, the sensor module detects one of the various use modes, in particular, the "Antenna Drawn" use mode. The device antenna 150 is mechanically coupled to the switch 420 to provide the state of the antenna 150. Once the antenna use mode scenario is determined, a switch 420 within the sensor module 320 is closed to complete a circuit. The completed circuit triggers an interrupt to the microprocessor 430 of the power controller module 330.

Upon detection of the interrupt, the microprocessor 430 calls the interrupt service routine 436. The interrupt service routine 436 is an asynchronous process that sends a signal to the processor to interrupt its current operation to process an incoming signal. The interrupt service routine sets the maximum power level in the power regulator 340 module. The power regulator 340 limits the transmitter 434 at the maximum transmit power. As a result, the transmitter 434 transmits at a power configuration according to the sensed use mode.

The abovementioned example in FIG. 4 is an embodiment of the "Antenna Drawn" use mode scenario. Other use mode scenarios, for example, "User Keyboard Activity" or "In Vehicle-Cradle" use mode also exists and would follow a similar process.

Figure 5:
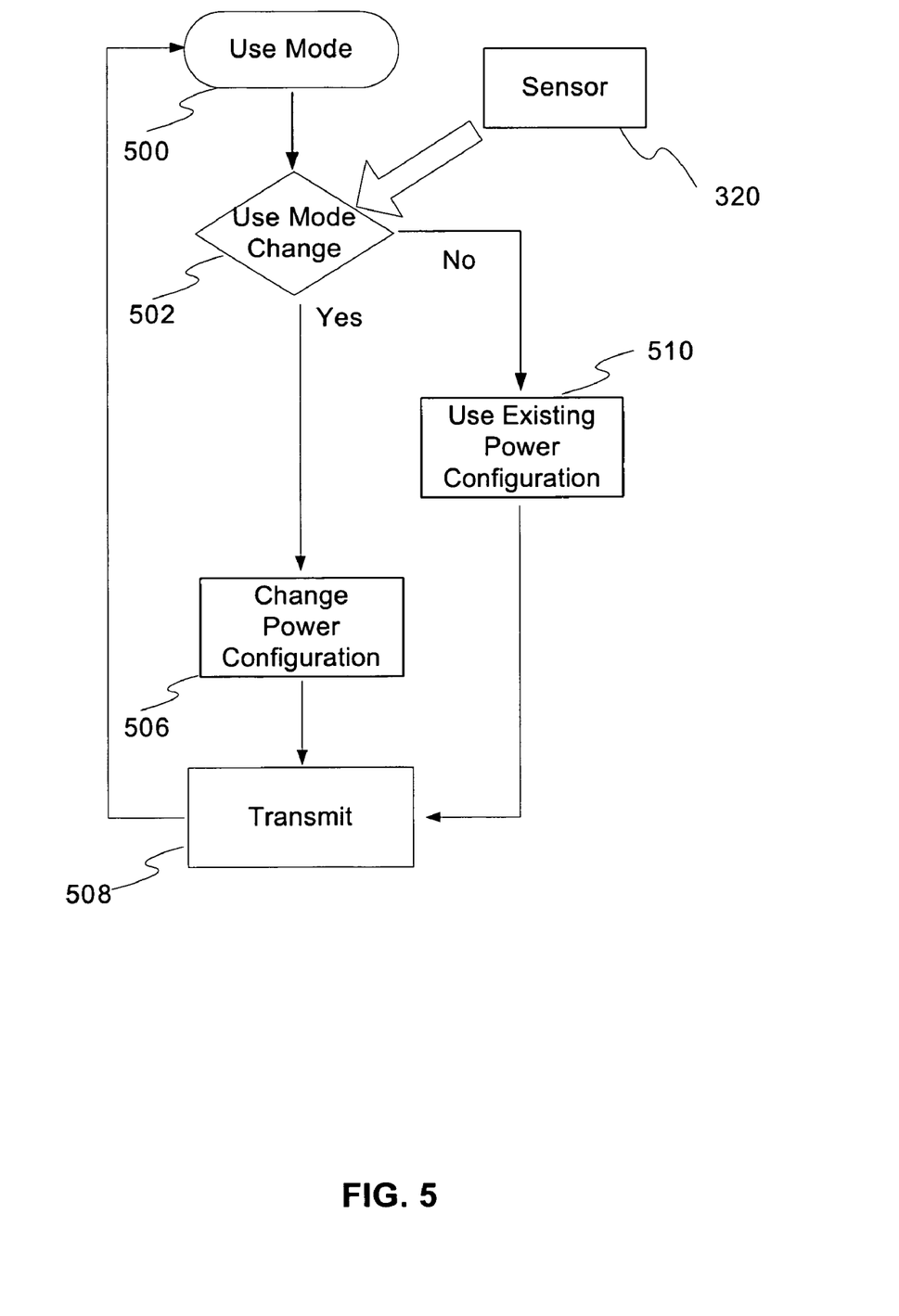
FIG. 5 is a system flow diagram illustrating the process flow of a use mode.

FIG. 5 is a system flow diagram illustrating the process flow of a use mode. The process initiates with the selection of a use mode 500. The state of this use mode is then determined; the sensor module 320 is used to determine whether the user mode has changed. If there is a change in the use mode 502, the power configuration 506 is adjusted accordingly and the resultant configuration values are passed onto the power regulator 340 to be transmitted 508. If there is no use mode change, the system uses the existing power configuration 510 to be transmitted 508.

Figure 6:
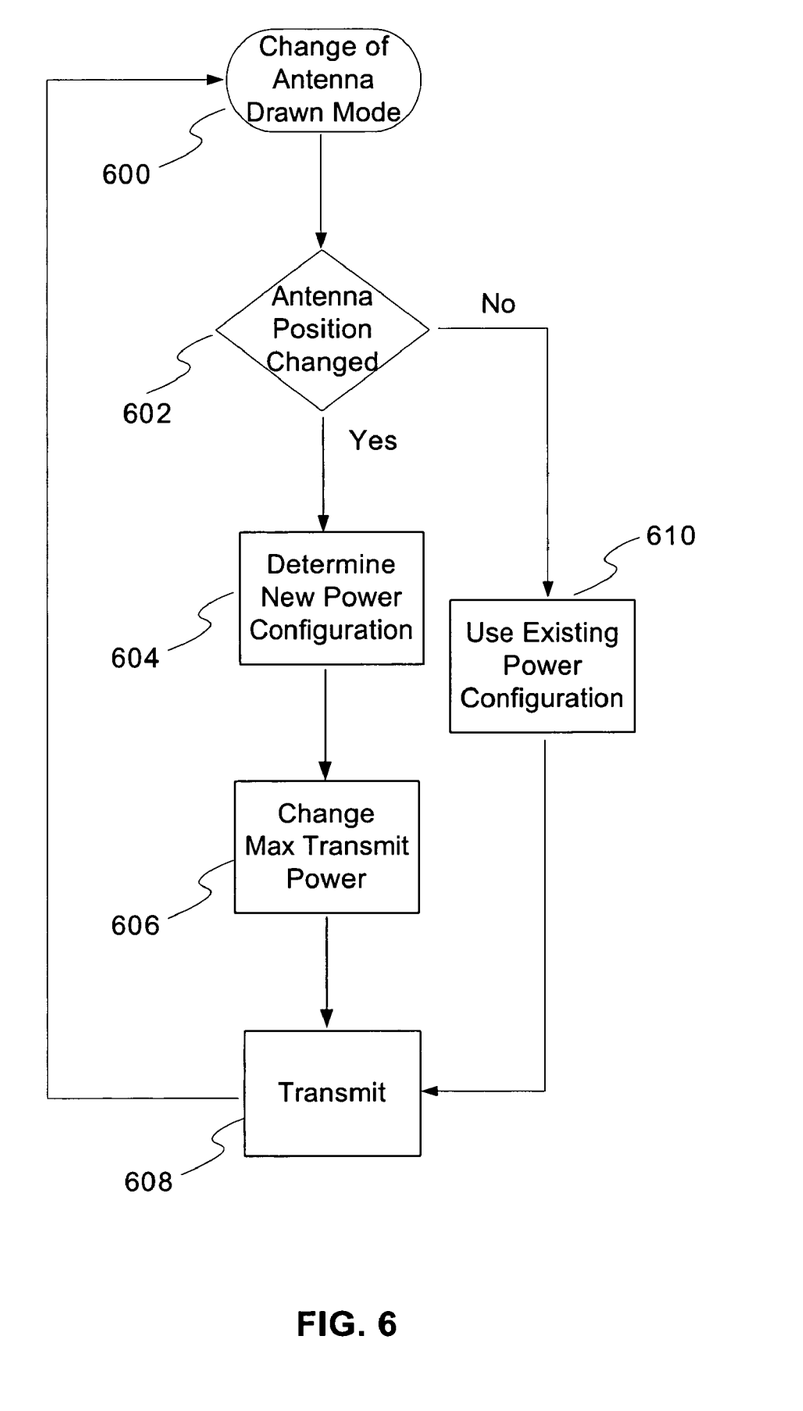
FIG. 6 is a system flow diagram illustrating the embodiments of the "Antenna Drawn" use mode.

FIG. 6 is a system flow diagram illustrating the embodiments of the "Antenna Drawn" use mode. In this use mode, the antenna 150 of the mobile wireless device 110 begins from an initial antenna drawn mode 600. This mode may have the antenna 150 initiate from an un-drawn state to an antenna drawn state, or vice versa—from an antenna drawn state to an un-drawn state. Furthermore, the mobile wireless device 110 in the "Antenna Drawn" use mode 600 may already be transmitting data; this change in state determines any new power configurations that can be used for further transmission of data.

The sensor 320 recognizes a change in antenna position 602. Triggered by this sensor signal, the microprocessor 430 starts the Interrupt Service Routine 436 to determine the optimal power configuration at step 604 and passes it to the power regulator 340. Executing the new configuration, the power regulator 340 changes the maximum transmit power allowable into the antenna 150 at step 606. If the sensor 320 recognizes no change in position, the existing power configuration is used at the transmitter 434 to be transmitted 608.

Figure 7:
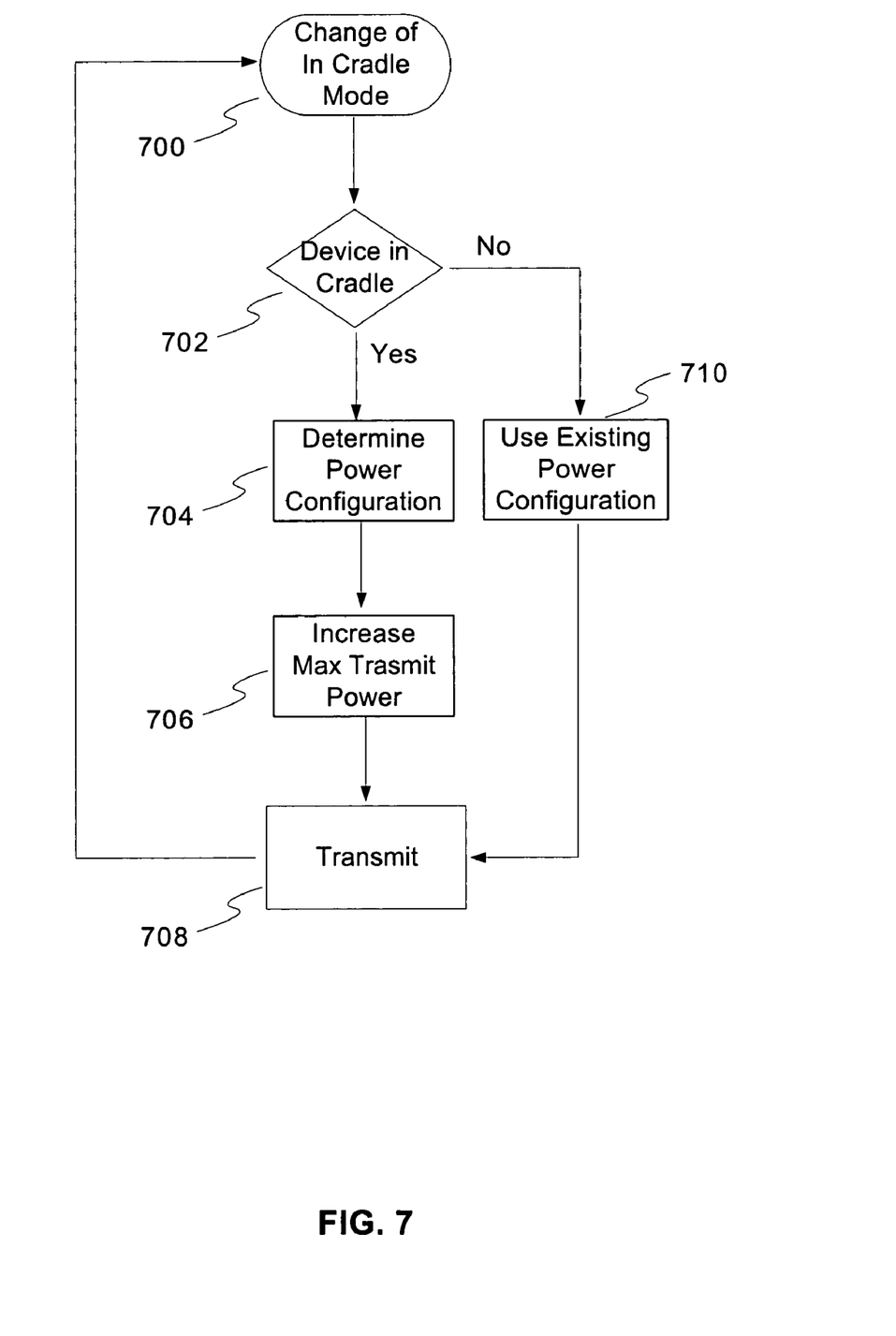
FIG. 7 is a system flow diagram illustrating the embodiment of the "In Cradle" use mode.

FIG. 7 is a system flow diagram illustrating the embodiment of the "In Cradle" use mode. In this use mode, the mobile wireless device is placed into the device cradle, thus causing the antenna configuration to change to compensate for the change in state. The antenna 150 of the mobile wireless device 110 starts from an out-of-cradle mode 700, where the device is placed into a cradle 702. This closes the switch 420 in the sensor module 320.

To implement this configuration, the sensor 320 determines whether the device is in a cradle. If it is in a cradle, the power controller 330 determines the new configuration 704 and increases the maximum allowed transmit power 706 to transmit the signal 708 at this new setting. If the device is not in the cradle, the system will use the existing power configuration 710 and send the signal to be transmitted 708. After transmitting the signal 708, the system will loop back to the beginning, ready to detect the next change of In Cradle mode 700.

One method of detecting different use modes 500 is to a variety of sensors 320. One practical sensor is a small acoustic proximity sensor located at the base of the antenna 150. The acoustic proximity sensor would measure the reflection off the closest surface and deduce the approximate distance to the operator's head and/or hand. This is beneficial because SAR (Specific Absorption Rate) is based on typical usage position. By relating the acoustic sensors output measurement with the apriori knowledge of the antenna SAR characteristics, it is possible further optimize the transmit power. It is also possible to use this sensor information to switch between different transmit antennas.

The above-described embodiments of the present application are intended to be examples only. Those of skill in the art may effect alterations, modifications and variations to the particular embodiments without departing from the scope of the application.

We claim:

1. A method for controlling a transmit power configuration for a wireless communication device, comprising:

using a first transmit power setting for the transmit power configuration upon initiation of a wireless communication;

during the wireless communication, detecting that the wireless communication device has entered a speakerphone mode; and in response to detecting that the wireless communication device has entered the speakerphone mode, automatically switching the transmit power configuration to a second transmit power setting during the wireless communication.

2. The method of claim 1, wherein the first transmit power setting is lower than the second transmit power setting.

3. The method of claim 2, wherein the first transmit power setting is selected to be within a predetermined transmit power limit for when the wireless communication device is near the user's head.

4. The method of claim 3, wherein the second transmit power setting is above the predetermined transmit power limit.

* * * * *